United States Patent [19]
Yoshimura

[11] Patent Number: 5,850,059
[45] Date of Patent: Dec. 15, 1998

[54] TOUCH INPUT PEN

[75] Inventor: Yutaka Yoshimura, Nara, Japan

[73] Assignee: Sharp Kabushiki Kaisha, Osaka, Japan

[21] Appl. No.: 665,075

[22] Filed: Jun. 14, 1996

[30] Foreign Application Priority Data

Jun. 19, 1995 [JP] Japan .................................. 7-151686

[51] Int. Cl.⁶ ............................ G08C 21/00; G09G 5/00
[52] U.S. Cl. ................................. 178/19.01; 178/19.04; 178/19.05; 345/179; 345/184
[58] Field of Search .................................. 345/179, 180, 345/181, 184; 15/428, 431; 401/32, 52, 110, 115, 117; 178/18.01, 18.03, 19.01, 19.03, 19.04, 19.05

[56] References Cited

U.S. PATENT DOCUMENTS

| | | | |
|---|---|---|---|
| 3,652,173 | 3/1972 | Miller | 401/110 |
| 4,115,015 | 9/1978 | Torii | 401/110 |
| 4,266,881 | 5/1981 | Rubens | 401/115 |
| 4,667,182 | 5/1987 | Murphy | 178/18 |
| 5,026,190 | 6/1991 | Longarzo | 401/32 |
| 5,131,775 | 7/1992 | Chen | 401/52 |

FOREIGN PATENT DOCUMENTS

2-145437  12/1990  Japan .

*Primary Examiner*—Vijay Shankar
*Attorney, Agent, or Firm*—David G. Conlin; William J. Daley, Jr.

[57] ABSTRACT

Disclosed is a touch input pen which is capable of changing its length and diameter when it is used and stored. Its outer diameter can be increased for assuring easy holding when inputting characters and graphics. The touch input pen comprises a pen-body portion having a through hole extending along the axial line thereof and having a tapered front end, a knob portion having a knob with a pen-sliding shaft 8 slidably inserted into the through hole in the pen-body portion, a grip portion composed of a plurality of chuck-like elements slidable on the tapered portion of the pen-body portion and a pen tip. A head portion secured to a front end of the pen-body portion and the pen-sliding portion can be moved to cover a head portion in a head holding portion by manipulating a knob.

6 Claims, 7 Drawing Sheets

TOUCH INPUT PEN

BACKGROUND OF THE INVENTION

The present invention relates to touch input pen that inputs any desired position on a transparent input key panel or an image on a display screen of an information processing device and, more particularly, to a touch input pen that is used for a portable miniature information processing device and can be held in the device body or its accessory.

In conventional electronic devices provided with a touch panel or a display screen through which characters or figures or operation signals are inputted with a touch input pen, there has been such a problem that the touch input pen may be easily lost or not suitably stored or is difficult to held in hand.

Japanese Laid-Open Patent Publication No. 2-145437 describes that an input pen can be stored in a cave or notch made within an electronic device body to assure portability of the device with said pen, preventing the latter from being lost.

Any touch input pen must have some thick grip portion of its barrel so that a user may firmly hold when drawing characters and graphics. Conventional touch input pens have been made to have evenly thick barrel or only thick grip portion.

The conventional touch pens for use with miniature information devices have been desired to be easy to hold and write. A thick pen is suitable to handle but it requires a larger storing cave in a device, resulting in increasing the thickness and width of the device even by thinning the device housing wall and reducing the sized of its internal parts. The device may be larger in size, worse in portability and more cost to manufacture.

SUMMARY OF INVENTION

A primary object of the present invention is to provide a touch input pen that can telescope when being used and stored in such a way that its grip may become thick for easily hold to input characters, graphics and the like into the device.

Another object of the present invention is to provide a touch input pen whose grip portion is made of material of high frictional resistance for easy handling.

Another object of the present invention is to provide a touch input pen whose grip portion has a bellows-like part for preventing slipping-off and may become thick conjointly with telescopic motion of the pen barrel.

Another object of the present invention is to provide a touch input pen which has a grip portion with a bellows-like part that can become thick conjointly with telescopic motion of the pen and prevent slipping-off, and which is extensible when it is used.

Another object of the present invention is to provide a touch input pen whose tip can be protected when being stored in conjunction with telescopic motion of the pen barrel and wherein a space formed between the pen tip and grip by compressive movement of a bellows-like grip portion can be filled.

Another object of the present invention is to provide a touch input pen whose bellows-like grip portion can be held in its compressed state and prevented from extending when a user grasps said portion.

PREFERRED EMBODIMENTS OF THE INVENTION

Figure 1A:
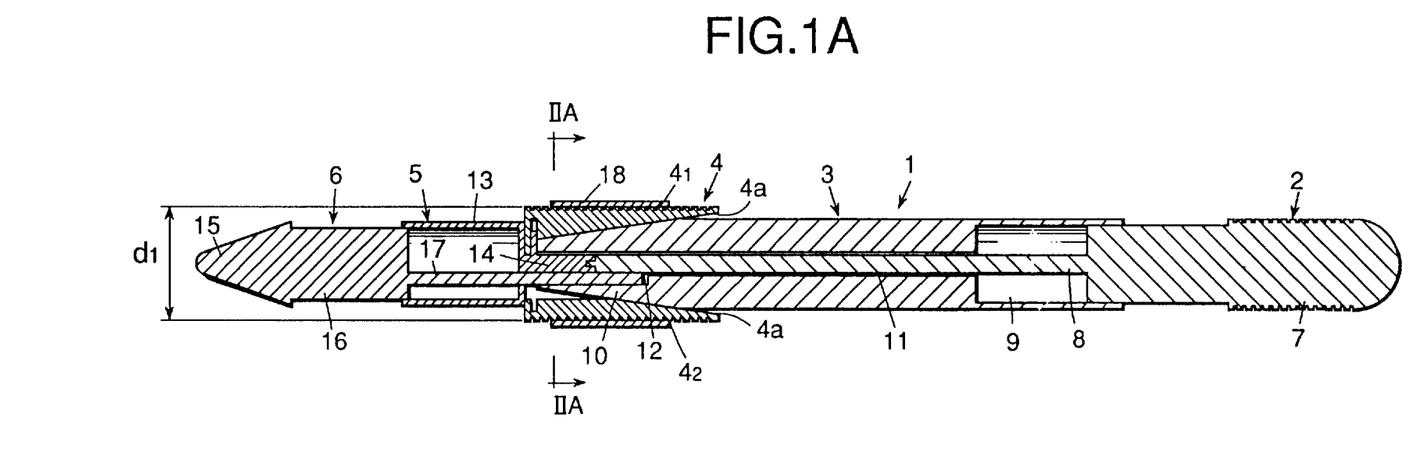
FIGS. 1A and 1B are longitudinal sectional views of a touch input pen embodying the present invention.
Figure 1B:
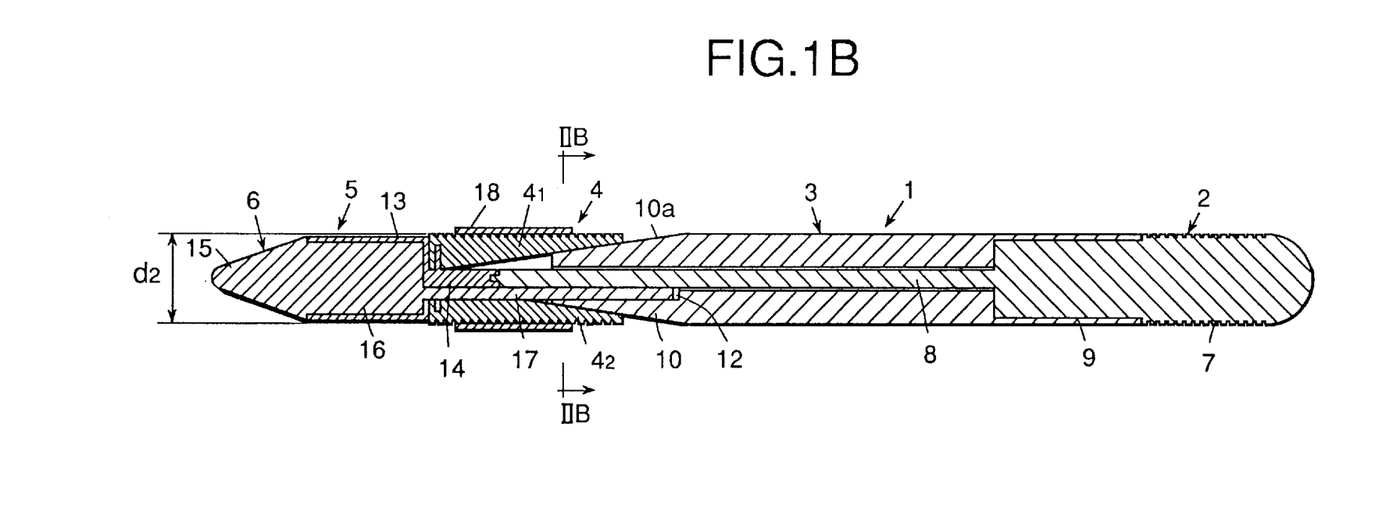
Figure 2A:
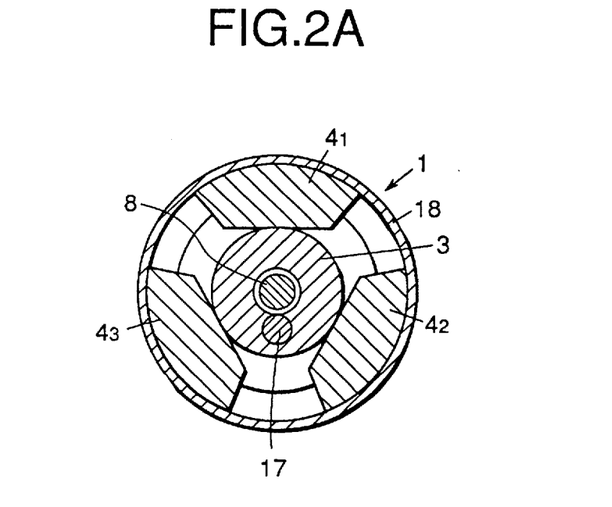
FIGS. 2A and 2B are transverse sectional views of the touch input pen of FIGS. 1A and 1B.
Figure 2B:
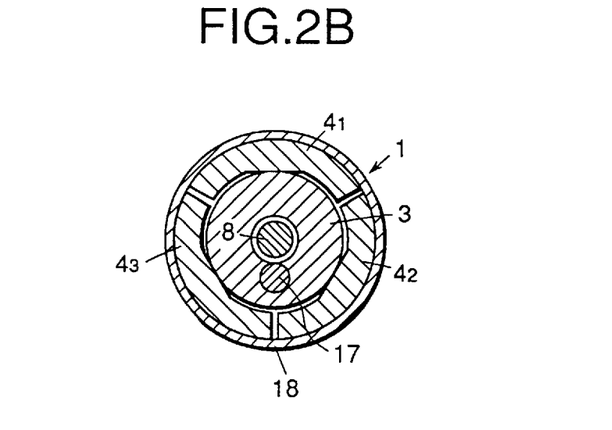

FIGS. 1A and 1B are sectional views of a touch input pen embodying the present invention. FIG. 1A is a sectional view of a touch input pen in working state while FIG. 1B is a sectional view of a touch input pen with its tip in retracted (stored) state. FIG. 2A is a section taken along line IIA—IIA of FIG. 1A and FIG. 2B is a section taken along line IIB—IIB of FIG. 1B.

Figure 3:
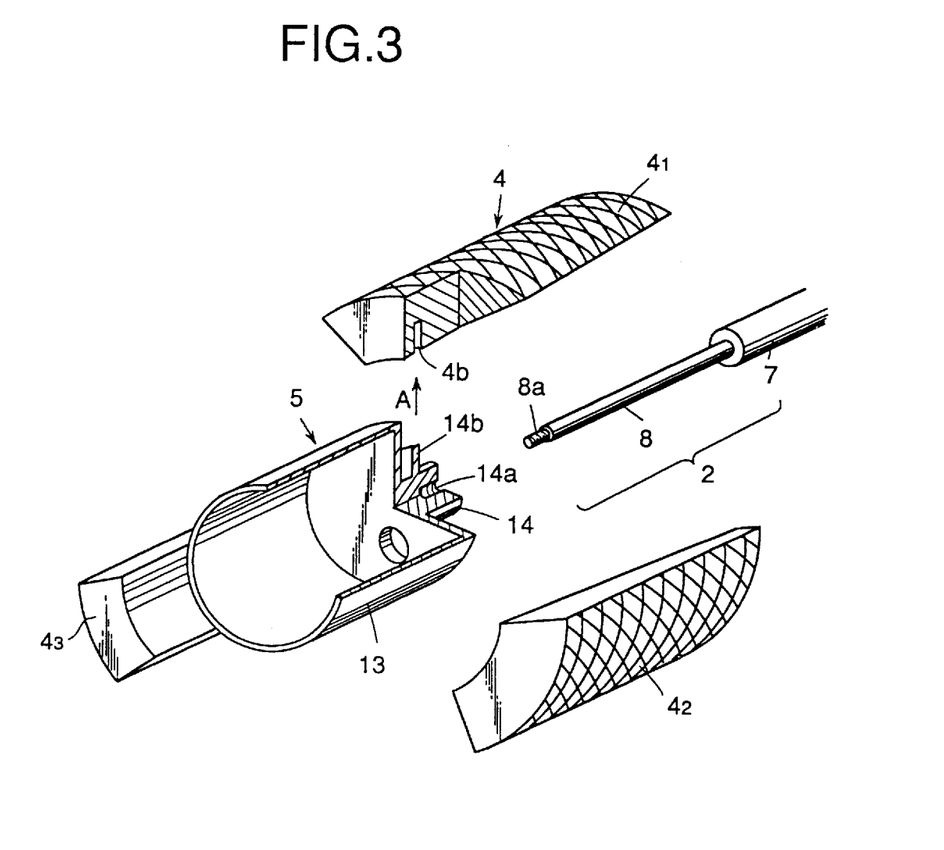
FIG. 3 is an exploded construction view for explaining a relationship between a knob portion, a grip portion and a head holding portion, which are shown in FIG. 1.

FIG. 3 is an exploded perspective view for explaining a relationship between a knob portion 2, a grip portion 4 and a head holding portion 5, which are shown in FIGS. 1A and 1B. As shown in FIG. 3, a sliding axle 8 of the knob portion 2 has a threaded front end 8a for threadedly engaging with a tapped hole 14a made in a connecting lug 14 of the head holding portion 5. Namely, the knob portion 2 can be integrally connected with the head holding portion 5 by screwing the threaded end 8a of the sliding axle 8 of the former into the tapped hole 14a of the connecting lug 14 of the latter. The head holding portion 5 and the knob portion 2, which are threadedly connected with each other in the shown example, may be bonded to each other with adhesive. The connecting lug 14 of the head holding portion 5 has an radially extending part 14b and each of split-grip elements $4_1$, $4_2$, $4_3$ has a slit 4b in which the radially extending part 14b of the connecting lug 14 loosely fits. The grip elements $4_1$, $4_2$ and $4_3$ therefore can move in a radial direction (shown by arrow A) along the radially extending part 4b of the connecting lug 14.

Figure 4:
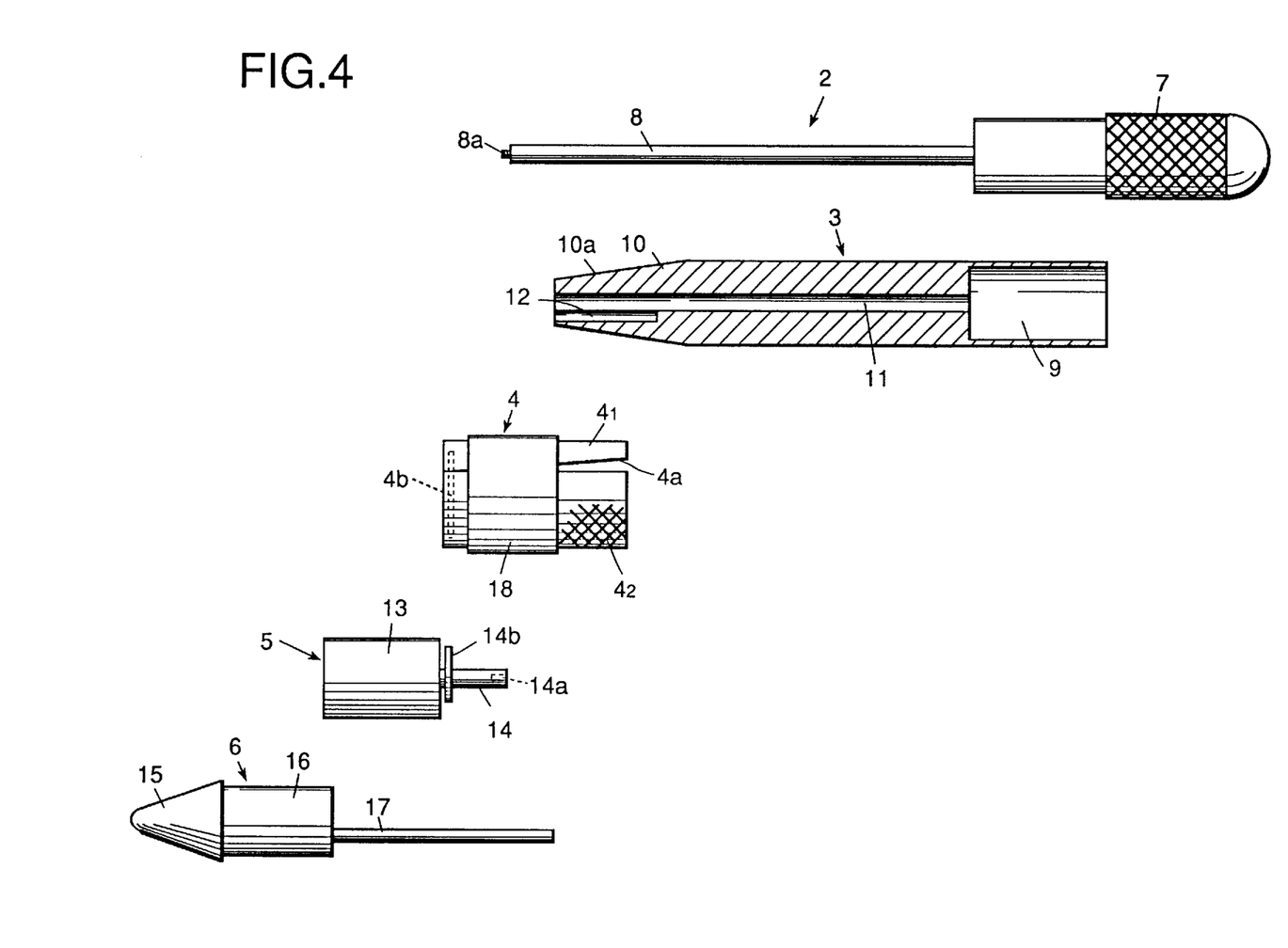
FIG. 4 is a schematic exploded view of portions composing a touch input pen according to the present invention.

FIG. 4 is an exploded construction view of a touch input pen 1 embodying the present invention, which comprises a knob portion 2, a pen body (barrel) 3, grip portion 4, a head holding portion 5 and a head portion 6. The knob portion 2 is composed of a knob 7 having an integrally connected rod-like pen-sliding axle 8 with a threaded end 8a. The pen body 3 has a cylindrical concave 9 made in one end face for accommodating a part of the knob 7 and has a tapered portion 10 with a tapered surface 10a made in the form of circular cone frustum at other end. The pen body 3 has a through hole 11 made in its center axis portion, which allows the pen-sliding axle 8 to slidably move in the axial direction therein, and it has also a connecting hole 12 which communicates with the through hole 11 in order to allow a head portion 6 to be coupled with the pen-sliding axle 8 as described later.

The grip portion 4 is a cylinder made of thermoplastic resin or metal (in some cases), which has a backward tapering wall with non-slip irregularities made on its external surface as shown for example in FIGS. 1A and 1B. Its cylindrical inner wall 4a is slant to match to a tapered external surface 10a of the tapered portion 10 of the pen body 3. This grip portion 4 may be made, for example, of three split elements $4_1$, $4_2$ and $4_3$ as shown in FIG. 3.

The head holding portion 5 is composed of a cylinder 13 that is capable of accommodating a part of the pen head 6 and which at its bottom has a connecting lug 14 for connecting with the pen-sliding axle 8 of the knob portion 2. The head portion 6 is composed of a conical pen-tip 15 and head body 16 with a projecting part 17 made at its bottom for coupling with the tapered portion 10 of the pen body 16.

The components of the touch input pen 1, which are disassembled as shown in FIG. 4, are assembled for example as follows:

The grip elements $4_1$, $4_2$, $4_3$ are first mounted on the head holding portion 5 in such a way that they are fitted at their slits 4b on the radially extending part 14b made on the connecting lug 14 of the head holding portion 5 and fixed with a rubber ring 18 putted thereon to be integrally held on the head holding portion 5. Next, the grip elements $4_1$, $4_2$, $4_3$ are fitted at their slant internal surfaces 4a on the tapered cylindrical surface 10a of the pen body portion 3. The pen-sliding axle 8 of the knob portion 2 is inserted into the through hole 11 made in the pen body 3 from the knob receiving side 9 thereof and then its threaded end 8a is screwed into the tapped hole 14a (or bonded thereto). The knob portion 2, the grip portion 4 (elements $4_1$, 42, 43) and the head-holding portion 5 are integrally coupled with each other.

With the thus assembled touch input pen 1 in the working state as shown in FIG. 1A, a user holds for example the pen body 3 in his left hand and pushes the knob portion 7 into the knob receiving portion 9. This operation causes the touch input pen to slide the grip portion 4 along the tapered portion 10 of the pen body 3, reducing its outside diameter from diameter $d_1$ to a diameter $d_2$ being substantially equal to the outer diameter of the pen body 3, and at the same time to move the cylinder 13 to enclose the head body 16 of the head portion. The touch input pen is now in the state for being stored as shown in FIG. 1B.

On the contrary, pulling the knob portion 7 causes that the grip portion 4 slides along the tapered portion 10 of the pen body, increasing its outer diameter from $d_2$ to $d_1$ for the working ready state.

The user may hold with own three fingers (thumb, forefinger and middle finger) the grip portion 4 of the touch input pen, which diameter is increased larger than that of the pen body 3 in the working ready state shown in FIG. 1A. The touch input pen set in the storing state is shorter than its full length in the working ready state.

Another embodiment of the present invention is similar in construction with the above-mentioned first embodiment (FIG. 1A, 1B) but differs from said embodiment by that its grip portion is made of elastic material of high-friction force such as synthetic rubber, elastomer and so on, whereas the grip portion of the first embodiment is made of hard material such as thermoplastic resin or metal. The grip portion 4 made of high-frictional elastic material is soft to the touch of fingers and may effectively prevent the head portion 6 from moving or slipping by virtue of an increased frictional force to be produced between the inner cylindrical surface of the grip portion 4 and the outer surface of tapered portion 10 of the pen body 3 when the user grasps with his fingers the grip portion 4 in the working state.

Figure 5A:
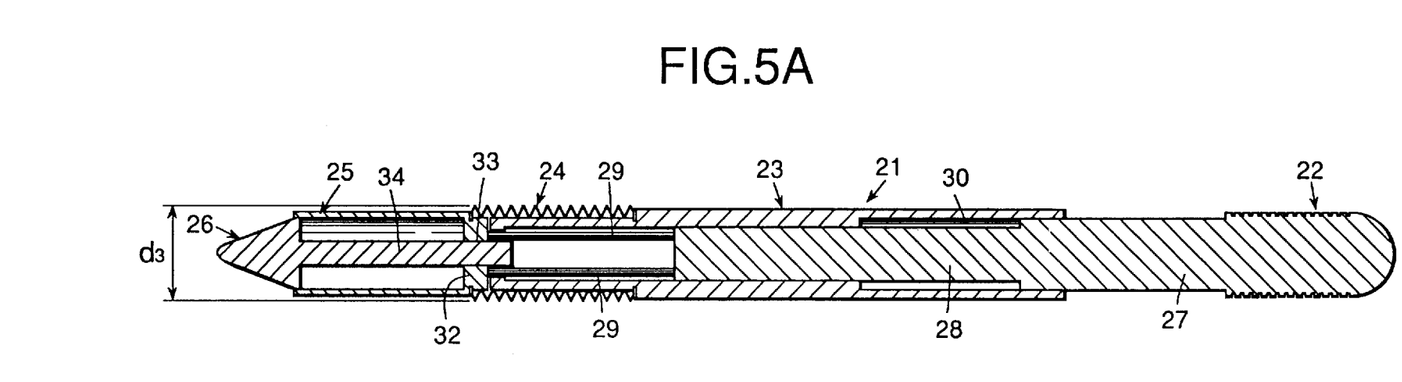
FIGS. 5A and 5B are longitudinal sectional views of another touch input pen according to the present invention.
Figure 5B:
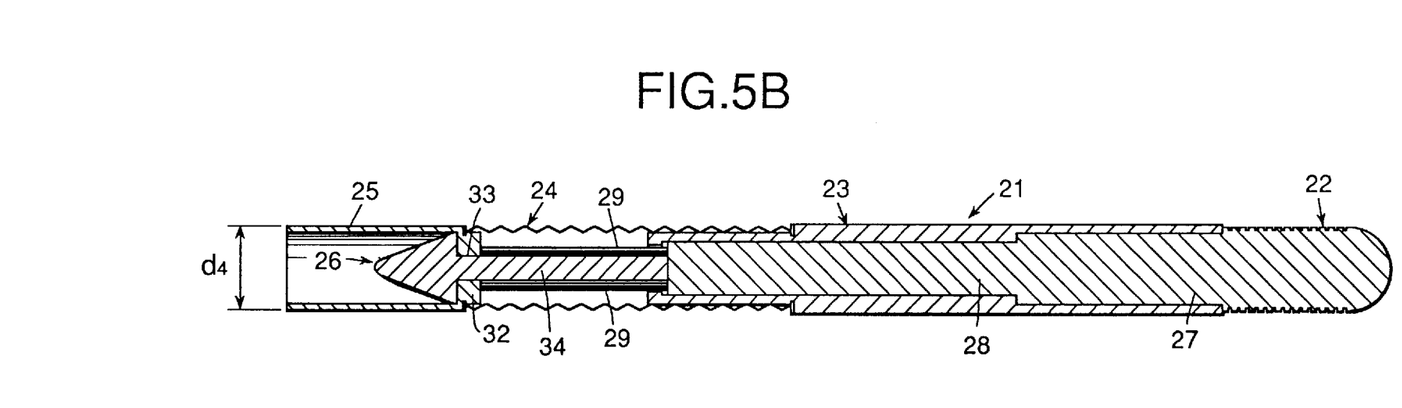

Another embodiment of the present invention will be described as follows:

Referring to FIGS. 5A and 5B, a touch input pen 1 comprises a knob portion 22, a pen body portion 23, a grip portion 24, a pen-tip holding portion 25 and a pen-tip portion 26.

The knob portion 22 is composed of a knob 27 having an integrally made rod-like pen-sliding axle 28 with a plurality of connecting rods 29. The pen body portion 23 has a cylindrical concave 30 made in one end face for accommodating a part of the knob 27 and a through hole made therein, which communicates with the concave 30 and allows the pen-sliding axle 28 to slidably move therein. The other end of the pen-body portion 23 has a specified part of smaller diameter to be covered by the grip portion 24.

The pen-tip holding portion 25 is composed of a cylinder 31 for accommodating a pen tip 26 and a bottom part 32 in which a through hole 33 is made.

The pen tip 26 has a connecting rod 34 which extends backward from the pen tip through the through hole 33 of the pen-tip holding portion 25 and is connected at its end integrally to the pen-sliding axle 28. The bottom part 32 of the pen-tip holding portion 25 is integrally connected to a plurality of connecting bars 29 which surrounds the connecting rod 34 of the pen tip 26.

The grip portion 24 is a bellows-formed cylinder made of elastic synthetic rubber, which is fitted through the pen tip 26 and the pen-tip holding portion 25 onto the free end of the pen-body portion 23 and is secured at its one end periphery to the bottom part 32 of the pen-tip holding portion 25 and at the other end periphery to the end of the pen-body portion 23.

The touch input pen 21 thus constructed may be set with contracted bellows of its grip portion in a state shown in FIG. 5A when it is used. When a user holds in his left hand the pen body portion 23 of the touch input pen in said working state and pushes by his right hand the knob 27 into the knob receiving concave 30 of the pen-body portion 23, the pen-tip holding portion 25 connected with the connecting bars 29 slidably moves, being guided by the connecting rod 34, toward the pen tip portion till the pen-tip portion 26 is entirely enclosed in the pen-tip holding portion 25. As the pen-tip holding portion 25 moves, the bellows of the grip portion 24 may reduce its thickness from a diameter $d_3$ in an entirely contracted state (FIG. 5A) to a diameter $d_4$ in an entirely expanded state (FIG. 5B), which is substantially equal to the outer diameter of the pen-body portion 23 as shown in FIG. 5B.

On the contrary, pulling the knob portion 27 of the touch input pen in the above-mentioned state (with the expanded bellows) causes the pen-tip holding portion 25 to slides and push out the pen tip 26 therefrom, increasing the outer diameter of the grip portion 24 from $d_4$ (with the expanded bellows) to $d_3$ (with the contracted bellows) in its working ready state.

In the state the touch input pen 21 is stored in an electronic device, its pen tip 26 is entirely enclosed in the pen-tip holding portion 25, being reliably protected from being damaged. Furthermore, the touch input pen 21 may be reliably stored as inserted to the bottom of a storing port of the electronic device by pushing knob 27 of the knob portion 22 because of the latter being integrally coupled with the pen-tip holding portion 25. It is therefore possible to provide the electronic device with a one-way-clutch type pen-tip drawing-out mechanism. In addition, it is also possible to fill a gap to be produced between the pen tip 26 and the grip portion 24 when the grip-portion bellows being contracted.

Figure 6:
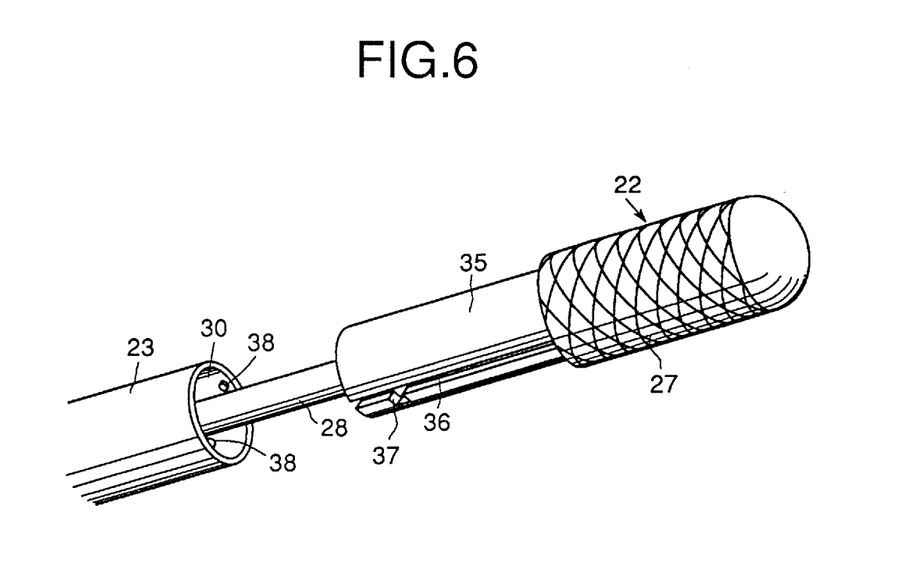
FIG. 6 is a perspective sectional view of an example of locking means of a touch input pen according to the present invention.

The touch input pen 1 can be locked in the working ready position shown in FIG. 5A by using locking means for locking the knob portion 27 with the pen-body portion 23, which is described as follows:

FIG. 6 is a partial perspective view of the touch input pen of FIG. 5A with its knob portion 22 being pulled to some extent from the pen-body portion 23. The sliding axle 35 extending from the knob 27 has two sliding grooves 36 made therein in the longitudinal direction and has a locking groove 37 made in the middle of each sliding groove 36. The knob receiving concave 30 has two lugs 38 oppositely provided on the inside wall thereof, which can slide in the respective sliding grooves and be locked in the respective locking grooves 37. Accordingly, the touch input pen 1 can be locked in the working position by slightly twisting the knob 27. The lugs 38 fall in the respective locking grooves, thereby the pen tip 26 may be more firmly held in the pen-body portion 23 while the pen is used.

Figure 7A:
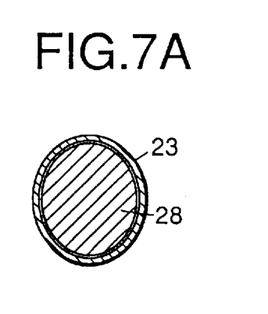
FIGS. 7A and 7B are transverse sectional views of another example of locking means of a touch input pen according to the present invention.
Figure 7B:
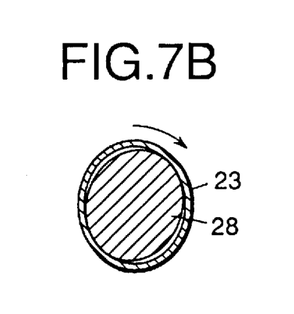

Referring to FIGS. 7A and 7B, there is shown another example of locking means for locking the knob portion 22 in the pen-body portion 23 in such a way that the knob portion 22 having an oval cross-section may be turned in the direction indicated by an arrow in FIG. 7B to be locked by friction at two points on the inside wall of the pen-body portion 23 having an oval section.

Figure 8A:
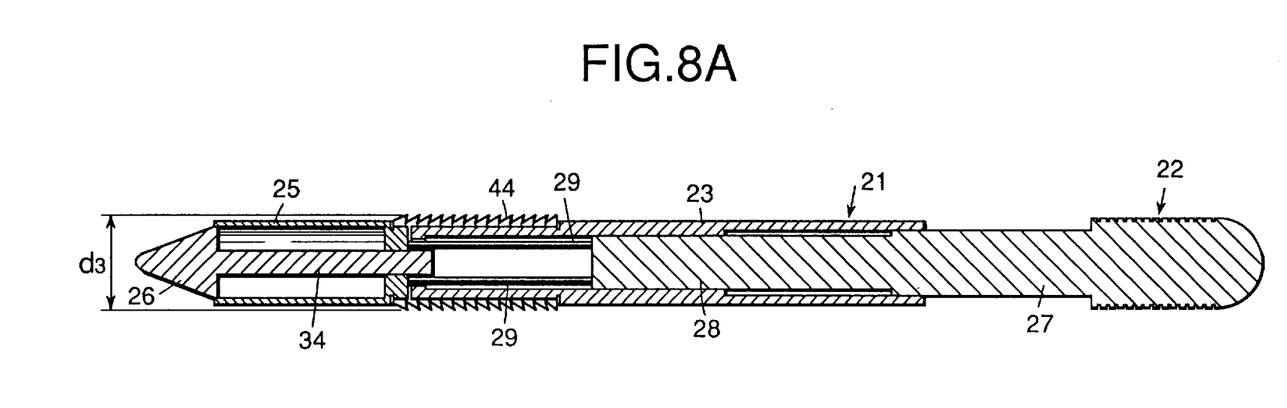
FIGS. 8A and 8B are longitudinal sectional views of another touch input pen embodying the present invention.
Figure 8B:
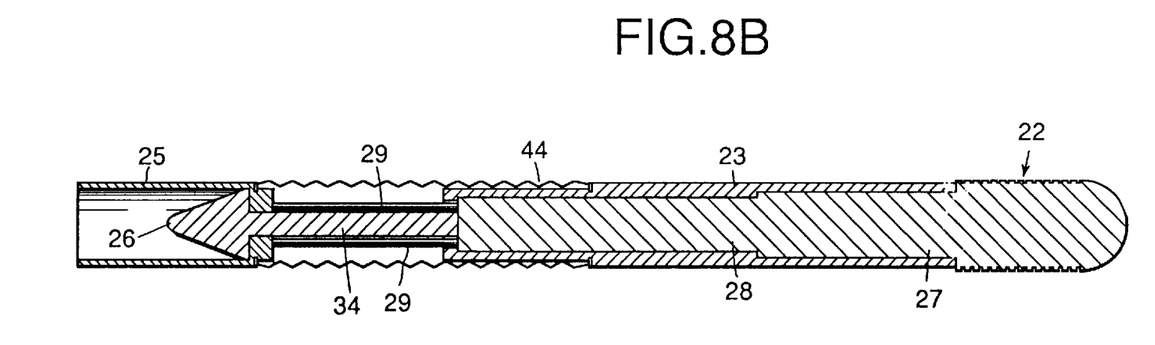

Another example of locking means uses grip portion 44 having slant toothed bellows shown in FIGS. 8A and 8B instead of the grip portion 24 having normal bellows shown in FIGS. 5A and 5B. When the grip portion 44 is grasped, its bellows may be further contracted to produce a force attracting the pen-tip holding portion 25 to the pen-body portion 23. This solution does not require any additional locking mechanism.

As be apparent from the foregoing, the touch input pen according to the present invention is capable of changing the thickness (diameter) of its grip portion to a desired value by shifting the sliding shaft having tapered tip in the axial direction of the pen-body portion to cause the hand grip portion to be pushed in the direction perpendicular to the axial direction. Namely, the grip portion may slide on the tapered end of the pen-body portion to increase or decrease its outer diameter when its sliding shaft is drawn out or into the pen-body portion.

The grip portion of the touch input pen may be made of synthetic rubber or elastomer being capable of producing high frictional force to improve its frictional characteristics.

Axial displacement of the hand-grasped bellow-type grip portion and the axially movable pen-sliding shaft may cause the grip-portion bellows to be contracted with increasing the depth of bellows, thereby increasing its outer diameter and slip-preventing effect.

As the grip portion is connected at one end to the front end of the pen-sliding shaft extending through the pen-body portion and is fitted at its other end on the pen-body portion, the grip portion may be contracted in inverse proportion to the motion of the pen-sliding shaft to elongate the pen.

The pen-sliding shaft has the pen-tip storing portion at its front end, which can protect the pen tip against possible stress when being stored and cover a gap to be formed between the pen-tip and the grip portion when the bellows moves in and out.

The bellows-type grip portion having an inclination may maintain its working position even if it is firmly grasped.

The touch input pen according to the present invention can offer the following advantages:

The touch input pen can increase the thickness of its grip portion from the outer diameter ($d_2$) in the storing state to the outer diameter ($d_1$) in the working state, assuring easy handling with it when inputting characters and graphics and the possibility of being stored at its decreased diameter ($d_2$) in a storing space within electronic device which housing has reduced size and contains miniaturized components. This means an increased portability (reduced size and weight) of the electronic device together with the touch input pen, which is also easy to use.

In addition to the above-mentioned features, the touch input pen has its grip potion of an increased elasticity and friction force, which is soft to fingers and will not slip off the hand when it is used for inputting characters or graphics. This may improve the quality of the touch input pen with a reduced load to hand during the input operation.

Using the bellows-type grip portion may reduce the number of components, achieves the same effect as above-mentioned and, at the same time, realizes the non-slip effect of the bellows.

The touch input pen wherein the bellows-type grip portion is connected at one end to the pen-tip receiving portion to be slidably moved by the pen-sliding shaft extending through the pen-body portion and is fitted at its other end on the pen-body portion, is capable of increasing a diameter of the grip portion as bellows contracts and the pen elongates. The pen is easy to use by virtue of an increased thickness of the grip portion, an increased length of the pen and an increased non-slip effect of the contracted bellows.

The pen-sliding shaft has the pen-tip receiving portion at its front end, which can protect the pen tip against possible stress when being stored, allow the pen to insert to the bottom of a storing pocket of an electronic device and cover a gap to be formed between the pen-tip and the grip portion when the bellows is contracted, thereby improving the effectiveness of using the touch input pen.

The bellows-type grip portion having slant toothed bellows may maintain its working position even if it is firmly grasped. This does not require any special means for the pen-sliding portion and the pen body portion.

I claim:

1. A touch input pen comprising a pen-body portion provided with a tapered front end and a knob storing tail end and having a through hole extending along the axial line thereof and communicating with the tapered front end and the knob storing end, a knob portion storable in the knob storing end and having a pen-sliding shaft slidably inserted into the through hole in the pen-body portion and a grip portion including a plurality of elements slidable on the tapered front end conjointly as the pen-sliding shaft moves, wherein said grip portion is capable of reducing its outer diameter by displacing the elements towards the front end through displacement of the pen-sliding shaft toward the tapered front end when the knob portion is pushed into the knob storing end and is capable of increasing its outer diameter by displacing the elements toward the knob-storing end through displacement of the pen-sliding shaft toward the knob-storing end when the knob portion is drawn out of the knob-storing end.

2. A touch input pen as defined in claim 1, wherein the grip portion is made of high-friction material.

3. A touch input pen comprising a pen-body portion having a through hole extending along the axial line thereof and provided with a pen tip at its front end through a connecting rod connected thereto and a knob storing portion in its tail end, a knob portion storable in the knob storing portion and having a pen-sliding shaft slidably inserted into the through hole in the pen-body portion, a pen-tip storing portion connected to the pen-sliding shaft, a bellows shaped grip portion connected at one end to the pen-sliding shaft and at the other end to the pen-tip storing portion, said grip portion being capable of reducing its outer diameter by elongation of its bellows through displacement of the pen-sliding shaft toward the front end when the knob portion is pressed into the knob storing portion and is capable of increasing its diameter by contraction of its bellows through displacement of the pen-sliding shaft toward the tail end when the knob portion is drawn out of the knob-storing portion.

4. A touch input pen as defined in claim 3, wherein the pen-tip storing portion is composed of a cylinder portion having a U-shaped cross-section and having an outward directed opening and a bottom portion having a through hole made therein for allowing the insertion of the connecting rod of the pen tip.

5. A touch input pen as defined in claim 3, wherein the bellows-shaped grip portion is a slant toothed bellows.

6. A touch input pen as defined in claim 2, wherein the high-friction material is one of synthetic rubber and an elastomer.

* * * * *